May 19, 1959 J. DUNER 2,886,831
AUTOMOBILE BED PLATFORM
Filed April 23, 1957 2 Sheets-Sheet 1
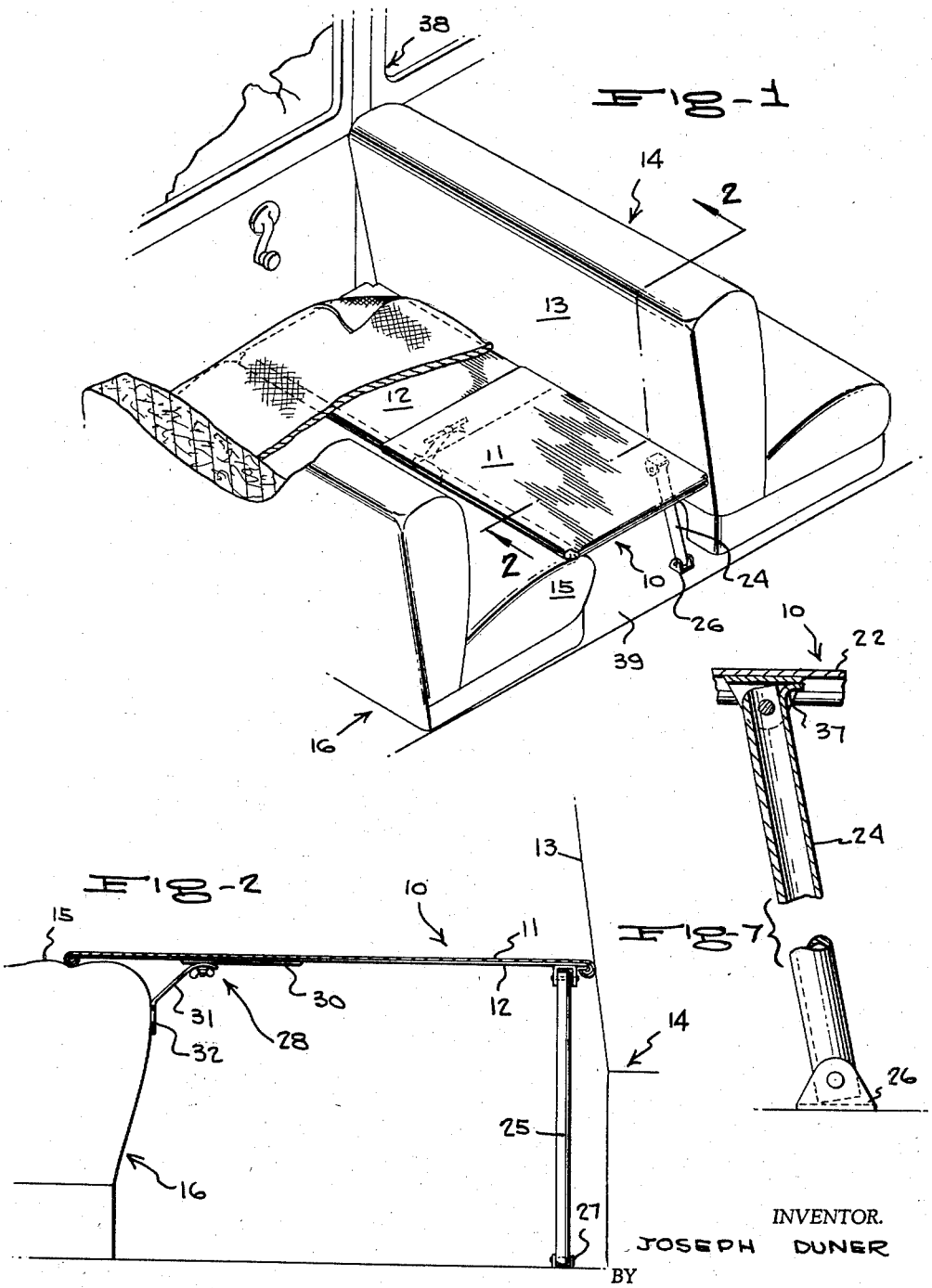
INVENTOR.
JOSEPH DUNER
BY
McMorrow, Berman & Davidson
ATTORNEYS May 19, 1959            J. DUNER            2,886,831
AUTOMOBILE BED PLATFORM
Filed April 23, 1957            2 Sheets-Sheet 2
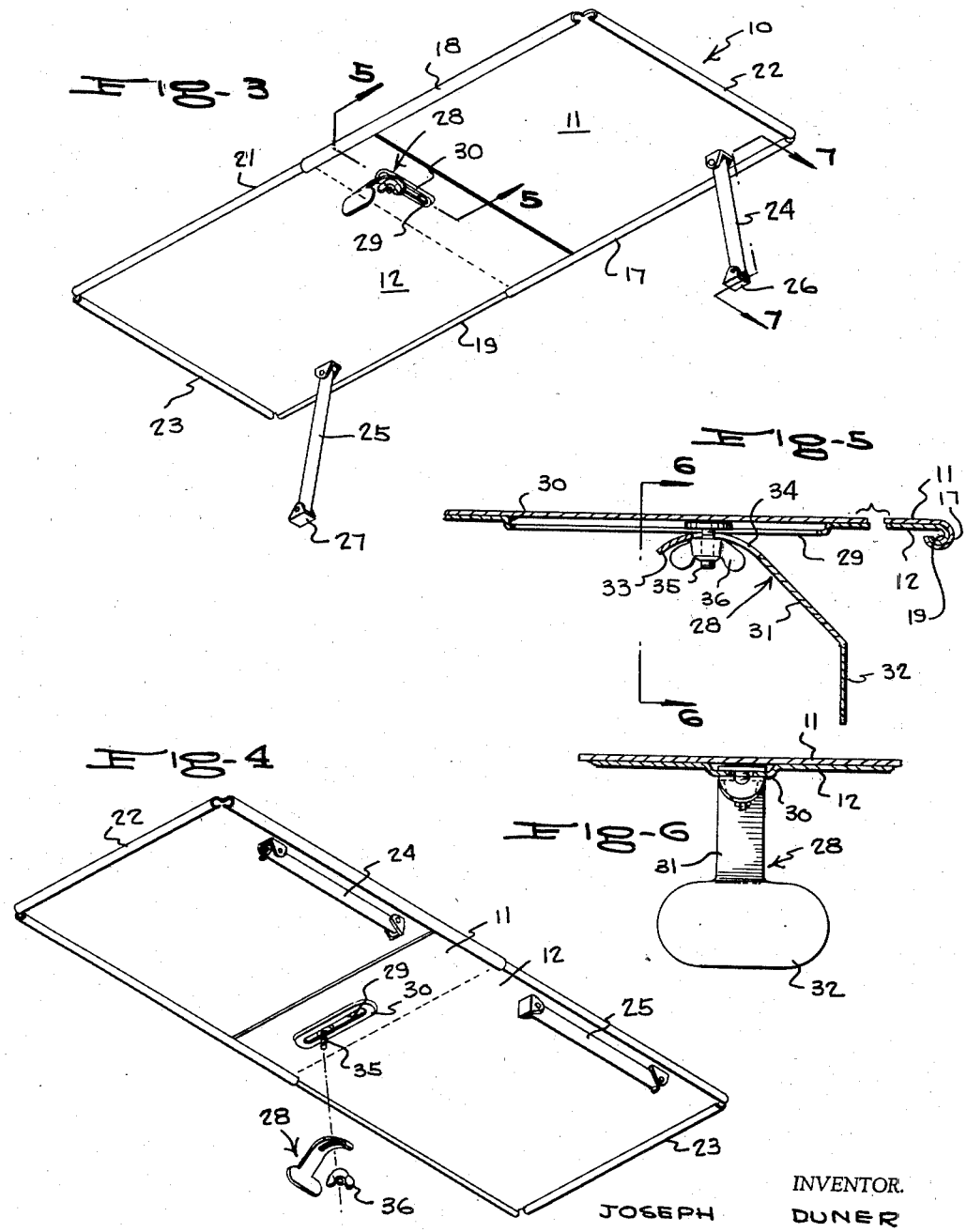
INVENTOR.
JOSEPH DUNER
BY
McMorrow, Berman & Davidson
ATTORNEYS

United States Patent Office 2,886,831
Patented May 19, 1959

2,886,831

AUTOMOBILE BED PLATFORM

Joseph Duner, Ventura, Calif.

Application April 23, 1957, Serial No. 654,490

3 Claims. (Cl. 5—94)

The present invention relates to a platform for erection within the space between the front and rear seats of an automobile body.

An object of the present invention is to provide a platform which lends itself to ready erection and disassembly within the space between the seat cushion of an automobile rear seat assembly and the upstanding back of the automobile front seat assembly, one which lends itself to safe support of a child or infant, one which is sturdy in construction and of few parts, one which is economical to manufacture and assemble, and one which is highly effective in action.

These and other objects and advantages of the present invention will be fully apparent from the following description when taken in connection with the annexed drawings, in which:

Figure 1 is an isometric view of the interior of an automobile having front and back seat assemblies, showing the platform of the present invention installed therein, Figure 2 is a sectional view, on an enlarged scale, taken on the line 2—2 of Figure 1, Figure 3 is an isometric view of the assembly shown in Figures 1 and 2, as seen from the bottom, Figure 4 is an isometric view, with portions of the platform in exploded view, and showing the leg supports and folded condition, Figure 5 is a sectional view, on an enlarged scale, taken on the line 5—5 of Figure 3, Figure 6 is a sectional view taken on the line 6—6 of Figure 5, and Figure 7 is a sectional view, on an enlarged scale, taken on the line 7—7 of Figure 3.

Referring in greater detail to the drawings in which like numerals indicate like parts throughout the several views, the automobile bed platform according to the present invention comprises a platform, designated generally by the reference numeral 10, having a first section 11 and a second section 12 telescoping within the first section 11. In Figure 1, the platform 10 is shown erected between the back 13 of an automobile front seat assembly 14 and the seat cushion 15 of the automobile back or rear seat assembly 16.

The side edges 17 and 18 of the first platform section 11 are rolled to an open partially cylindrical shape each receiving the similarly rolled side edges 19 and 21 of the platform second section 12 for extensile and retractile movement of the section 12 with respect to the section 11.

One end edge 22 of the platform section 11 is rolled to provide rigidity and the opposed end edge 23 of the platform section 12 is similarly rolled. A leg 24 is positioned underneath the platform section 11 adjacent the side edge 17 and contiguous to the adjacent end edge 22. The leg 24 has one end pivotally connected to the underside of the platform section 11 and has an anchoring foot 26 pivotally connected to its other and lower end. The leg 25 is similarly positioned with respect to the side edge 19 of the section 12 and the adjacent end edge 23 of that section and is provided on its lower end with a similar anchoring foot 27 pivotally connected thereto.

A brace element, designated generally at reference numeral 28, is positioned underneath the platform section 12 adjacent the telescoping end portion thereof and inwardly of and adjacent the side edge 21 of the platform section 12. A portion of the platform section 12 is downwardly bent along a median transverse line to provide a slideway on the under face of the platform section 12, said slideway having a slot 29 extending longitudinally therealong, the slideway being designated by the reference numeral 30.

The brace element 28 is of substantially inverted T-shape having a portion of its stem 31 immediately adjacent the horizontally disposed arms 32 extending upwardly at an angle with respect to the vertically disposed plane of the arms 32. The portion of the stem 31 adjacent its upper end is arcuately curved, as at 33 and provided with a closed slot 34 for the reception therethrough of a bolt element 35 having a wing nut 36 on the lower end thereof. The bolt element 35 also extends through the slot 29 in the slideway 30 and forms a means for detachably connecting the brace element 28 to the slideway 30 in any position of its adjusted movement along the slideway 30 and also in any position of the movement of the brace element 28 relative to the slideway 30 so that the arms 32 thereof may be shifted arcuately from the vertical plane position to other positions for engagement with the rounded front portion of the seat cushion 15 of the rear or back seat assembly 16.

Each of the legs 24 and 25 is provided at its upper end with a stop means as at 37 limiting the outwardly swinging movement of such legs 24 or 25.

In use, the platform 10 is erected in the space in an automobile body 38 between the back 13 of the front seat assembly 14 and the seat cushion 15 of the tandemly arranged spaced rear seat assembly 16 with the arms 32 of the brace element 28 engaging the front of the seat cushion 15 and with the side edges 17 and 19 of the platform sections 11 and 12, respectively, bearing against the rear face of the back 13 of the front seat assembly 14. When so positioned, the portion of the section 11 adjacent the side edge 18 and the portion of the section 12 adjacent the side edge 21 rests upon the seat cushion 15 of the rear seat assembly 16 with the legs 24 and 25 positioned in an upwardly sloping direction transversely of the automobile body 38 and having the feet 26 and 27, respectively, resting upon the floor 39 of the automobile body 38. The arms 32 of the brace element 28 abuttingly engage the front of the seat cushion 15 when the platform sections 11 and 12 are so positioned in the space between the seat cushion 15 and the upstanding back 13, and the position of the legs 24 and 25 engaging the floor 39 adjacent the back 13 support the platform sections 11 and 12 in a horizontal position and prevent movement of the latter under the weight of a child or infant and during movement of the automobile body 38 over a road surface.

The adjustable movement of the brace element 28 upon the bolt element 35 and also along the slideway 30, an important feature of the present invention, enables the user thereof to adjust the brace element 28 so that the arms 32 are coplanar with the front wall of the seat cushion 15 and are less likely to mar the seat cushion 15 or damage the latter when the brace element 28 is drawn up tightly toward the seat cushion 15.

What is claimed is:

1. For use with an automobile body including a floor, a front seat assembly including an upstanding back fixedly mounted on said floor, and a rear seat assembly including a seat cushion arranged in tandem spaced relation with respect to said front seat assembly; a platform erectable within the space between the upstanding back of said front seat assembly and the seat cushion of said rear seat assembly, said platform including a pair of side edges and a pair of end edges between adjacent ends of said side edges, a pair of spaced legs positioned underneath said platform adjacent one of said side edges, each of said legs being contiguous to one of the end edges and having one end connected to said platform, and a brace element positioned underneath said platform and having one end slidably connected to said platform and having the other end adapted to engage the front of the seat cushion of said rear seat assembly, said platform when in erected position having said one side edge bearing against the rear face of said upstanding back of said front seat assembly and the portion adjacent said other side edge resting upon the seat cushion of said rear seat assembly with the legs engaging the floor adjacent the upstanding back of said front seat assembly.

2. For use with an automobile body including a floor, a front seat assembly including an upstanding back fixedly mounted on said floor, and a rear seat assembly including a seat cushion arranged in tandem spaced relation with respect to said front seat assembly; a platform erectable within the space between the upstanding back of said front seat assembly and the seat cushion of said rear seat assembly, said platform including a pair of side edges and a pair of end edges between adjacent ends of said side edges, a pair of spaced legs positioned underneath said platform adjacent one of said side edges, each of said legs being contiguous to one of the end edges and having one end connected to said platform, said platform comprising a plurality of sections arranged in superimposed partially overlapping relation with respect to each other and connected together for telescoping movement relative to each other, and a brace element positioned beneath said platform and having one end slidably connected to the overlapped end portion of the lowermost one of said sections and having the other end adapted to engage the front of the seat cushion of said rear seat assembly, said platform when in erected position having said one side edge bearing against the rear face of said upstanding back of said front seat assembly and the portion adjacent said other side edge resting upon the seat cushion of said rear seat assembly with the legs engaging the floor adjacent the upstanding back of said front seat assembly.

3. For use with an automobile body including a floor, a front seat assembly including an upstanding back fixedly mounted on said floor, and a rear seat assembly including a seat cushion arranged in tandem spaced relation with respect to said front seat assembly; a platform erectable within the space between the upstanding back of said front seat assembly and the seat cushion of said rear seat assembly, said platform including a pair of side edges and a pair of end edges between adjacent ends of said side edges, a pair of spaced legs positioned underneath said platform adjacent one of said side edges, each of said legs being contiguous to one of the end edges and having one end connected to said platform, a depending brace element positioned underneath said platform having one end contiguous to said platform and the other end spaced from said platform, the portion of said brace element adjacent said one end being longitudinally curved and provided with a longitudinally extending slot, and fastening means extending through said slot and connecting said brace element to said platform for transverse sliding and arcuate movement with respect to said platform, the other end of said brace element being adapted to engage the front of the seat cushion of said rear seat assembly, said platform when in erected position having said one side edge bearing against the rear face of said upstanding back of said front seat assembly and the portion adjacent said other side edge resting upon the seat cushion of said rear seat assembly with the legs engaging the floor adjacent the upstanding back of said front seat assembly.

References Cited in the file of this patent

UNITED STATES PATENTS

| 328,157 | Tyler | Oct. 13, 1885 |
| 810,718 | Clark | Jan. 23, 1906 |
| 2,163,198 | Gossard | June 20, 1939 |
| 2,641,773 | Kramer | June 16, 1953 |
| 2,650,374 | Pierce | Sept. 1, 1953 |
| 2,695,048 | Jenner | Nov. 23, 1954 |
| 2,696,246 | Putnam | Dec. 7, 1954 |

FOREIGN PATENTS

| 185,825 | Great Britain | Sept. 11, 1922 |